United States Patent [19]

Camerik

[11] 4,389,717
[45] Jun. 21, 1983

[54] APPARATUS FOR WRITING AND/OR READING INFORMATION ON A ROTARY INFORMATION DISC WITH THE AID OF A RADIATION BEAM

[75] Inventor: Eduard Camerik, Eindhoven, Netherlands

[73] Assignee: U.S. Philips Corporation, New York, N.Y.

[21] Appl. No.: 207,324

[22] Filed: Nov. 17, 1980

[30] Foreign Application Priority Data

Jul. 31, 1980 [NL] Netherlands .......................... 8004379

[51] Int. Cl.³ .......................... G11B 1/00; G11B 7/18
[52] U.S. Cl. .................................. 369/75; 369/76; 369/111; 358/906
[58] Field of Search .................. 358/128.5, 128.6, 335, 358/342, 345; 350/61, 65, 67; 369/44, 45, 46, 76, 78, 75, 111, 112, 118, 119; 360/97, 99, 133

[56] References Cited

U.S. PATENT DOCUMENTS

| | | | |
|---|---|---|---|
| 3,839,601 | 10/1974 | Kimura et al. | 369/111 X |
| 3,842,197 | 10/1974 | Broussaud et al. | 369/111 X |
| 3,977,684 | 8/1976 | Camerik | 369/44 X |
| 4,003,091 | 1/1977 | Wright | 360/99 X |
| 4,106,057 | 8/1978 | Van Vroenhoven | 369/112 X |
| 4,183,069 | 1/1980 | Roullet et al. | 360/99 X |

OTHER PUBLICATIONS

Kawecki, "Protective Shield for Laser Lens", IBM Tech. Disc. Bulletin, vol. 13, No. 10, Mar. 1971, p. 3165.

*Primary Examiner*—John H. Wolff
*Assistant Examiner*—Donald McElheny, Jr.
*Attorney, Agent, or Firm*—Thomas A. Briody; Robert T. Myer; Algy Tamoshunas

[57] ABSTRACT

By means of a radiation beam, an apparatus writes or reads information on an information surface of a rotary optical information disc (21), which apparatus comprises an objective frame (16) on which an objective (17) for concentrating the radiation beam to a radiation spot is mounted by means of a parallel guide (19) in such a way that it can move in the direction of its optical axis (18). The objective is protected against dust, contaminants and mechanical damage by means of stationary plane-parallel radiation-transparent shielding means (22), which are interposed between the objective and the rotary information disc, the lens system of the objective being corrected for the optical properties of the shielding means.

8 Claims, 6 Drawing Figures

APPARATUS FOR WRITING AND/OR READING INFORMATION ON A ROTARY INFORMATION DISC WITH THE AID OF A RADIATION BEAM

FIELD OF THE INVENTION

The invention relates to an apparatus for writing and/or reading information with a radiation beam on an information surface of an information disc which rotates about an axis of rotation. Such apparatus comprises: a main frame; an objective frame; an objective which is movable relative to the objective frame for concentrating the radiation beam to a radiation spot in a focussing plane and which comprises a lens system with one or more lenses and with an optical axis as well as a free end to be directed to an information disc; and a parallel guide for guiding the movements of the objective in the direction of its optical axis.

DESCRIPTION OF THE PRIOR ART

Such apparatus is for example, known from U.S. Pat. No. 3,977,684. The apparatus disclosed in said patent, a video disc player in which the main frame comprises a cabinet with a radial slot in which the objective is movable by means of the movable objective frame. Since it is generally undesirable to have an open slot in the cabinet of a video disc player, through which dust may penetrate into the interior of the apparatus and through which a user may come into contact with live parts, the slot in the known video disc player is sealed by sealing means which move along with the objective frame. Said means may, for example, be constituted by a strip which moves with the objective frame and is guided over rollers. It may be desirable to also protect the objective itself against dust, mechanical damage and touching. This is because the objective is an expensive and comparatively vulnerable part, whilst moreover the surface of the lens that faces the information disc should be kept free from contaminants as far as possible. Therefore, the lens surface is preferably cleaned periodically which inevitably means that the objective is subject to a mechanical load.

SUMMARY OF THE INVENTION

It is the object of the invention to provide an apparatus of the type mentioned in the opening paragraph, which provides a better protection of the objective and which is characterized in that near the free end of the movable objective there are arranged stationary plane-parallel, radiation-beam-transmitting shielding means. The shielding means are connected to the main frame transversely of the optical axis, between the lens system and the location of a rotary information disc, for shielding the objective from dust, contaminants and mechanical damage, and that the lens system is corrected for the optical properties of the shielding means. The invention provides an effective protection of the movable objective. However, a requirement is that there should be a sufficient operating distance between the objective and the rotary information disc. It is found possible to develop objectives for optical video disc players having an operating distance of roughly 4 mm, whilst an even larger operating distance seems to be possible. Obviously, the surface of the shielding means facing the information disc should also be kept clean. Regular contact with the surface of the shielding means is therefore inevitable. However, when said means are touched, neither the objective nor the objective frame is subjected to any load. In this respect it is to be noted that from U.S. Pat. No. 3,855,426 it is known per se to interpose a kind of plane-parallel optical element between an objective and a rotary information disc in an apparatus of the type mentioned in the opening paragraph. The presence or absence of said optical element in said apparatus determines which information tracks of the information disc are being read. The plane-parallel optical element is not mounted stationarily on the main frame of the apparatus, but movably and therefore does not constitute a shielding means which can protect the objective against contaminants, dust and mechanical damage.

An embodiment of the invention is characterized in that the shielding means comprise a plane-parallel shielding plate having a thickness not greater than 0.5 mm. It is found that if the plane-parallel shielding plate has a thickness of the order of some tenths of mm only a minimal correction of the lens system is required. In a video disc player the light beam projected by the lens system has a diameter smaller than 10 mm, so that the shielding plate may have a width of the order of 8 mm. For such a small width of the shielding plate a thickness of a few tenths of mm. will not necessarily lead to an unacceptable fragility of the shielding plate.

A further embodiment of the invention is useful for apparatus of the type mentioned in the opening paragraph in which the objective frame is movable relative to the main frame, permitting the objective to describe a path relative to the main frame between a first extreme position nearer the axis of rotation of the information disc and a second extreme position nearer the circumference of the information disc. As stated previously, such apparatus is known from U.S. Pat. No. 3,977,684. This embodiment is characterized in that the shielding means extend at least between the first and the second extreme position over the entire length of said path. When this embodiment is used the shielding means may also function as sealing means for a slot formed in the cabinet of the apparatus, so that the shielding means have a dual function. An additional advantage of such an application is moreover that a more attractive styling can be obtained. The user of a video disc player to which this embodiment is applied will see no moving parts of the objective system of the apparatus at all. Only a drive spindle with a supporting table for the video disc will project from the deck.

In order to obtain a maximum mechanical strength of a plane-parallel shielding plate in an apparatus in accordance with a previously mentioned embodiment of the invention a further embodiment of the invention is of interest, which is characterized in that the shielding plate comprises a moulded polyamide foil. Apart from a number of suitable optical properties polyamide foils, generally have as less suitable properties that double refraction may occur owing to internal stresses in the material caused by mechanical operations. However, in the case of moulded polyamide foils this disadvantage is found to be mitigated or substantially eliminated.

A further embodiment is characterized in that the objective is accommodated in an enclosure which surrounds the objective in a substantially dust-tight manner and that the shielding means from part of said enclosure. This embodiment has important additional advantages. It has been found that the movements of the objective in an optical video disc player are the main source of annoying spurious sounds of the disc player. Owing to irregularities in the location of the information surface of the video disc focussing movements of the objective are necessary during each revolution of the disc. These movements are automatically controlled by an electrical servo control provided for this purpose. The video disc rotates with a speed of 25 or 30 revolutions per second, depending on the mains frequency, so that the movements of the objective have a fundamental frequency of 50 or 60 Hz respectively. In addition, there are several harmonics at frequencies up to several kHz. The human ear is very sensitive to air vibrations in this frequency range. It is therefore of great importance to accommodate the objective in an enclosure which is as far as possible closed, so that the annoying sounds are subdued as far as possible.

If an apparatus in accordance with a previously mentioned embodiment is employed, in which the objective is movable between a first and a second extreme position, i.e. from nearer the centre of an information disc towards its circumference, a further embodiment of the invention is of importance in order to preclude an undesired contact between the shielding means and the edge of a slightly sagging information disc. This embodiment is characterized in that on the main frame there is arranged at least one stop roller near the second extreme position of the objective for cooperating with the edge of the information disc in a rolling fashion. In the case of a slightly sagging information disc the stop roller, normally speaking, only cooperates with a part of the circumference of the information disc when the disc is accelerating to its operating speed. The centrifugal forces which are exerted on the information disc by the rapid rotation tend to straighten the disc in a plane perpendicular to the axis of rotation. It is also possible to utilize another embodiment of the invention which is characterized in that near the first extreme position of the objective frame the shielding means is connected to the main frame so as to be pivotable about a pivoting axis perpendicular to the axis of rotation of the information disc. The objective frame and the shielding means are provided with pivoting means which cooperate with each other and, when the objective frame moves from the first extreme position to the second extreme position, the shielding means are pivoted from the inclined position to the level position and vice versa by cooperation of said pivoting means.

BRIEF DESCRIPTION OF THE DRAWINGS

The invention will now be described in more detail with reference to the drawing, which relates to some embodiments and in which.

DESCRIPTION OF THE PREFERRED EMBODIMENTS

Figure 1:
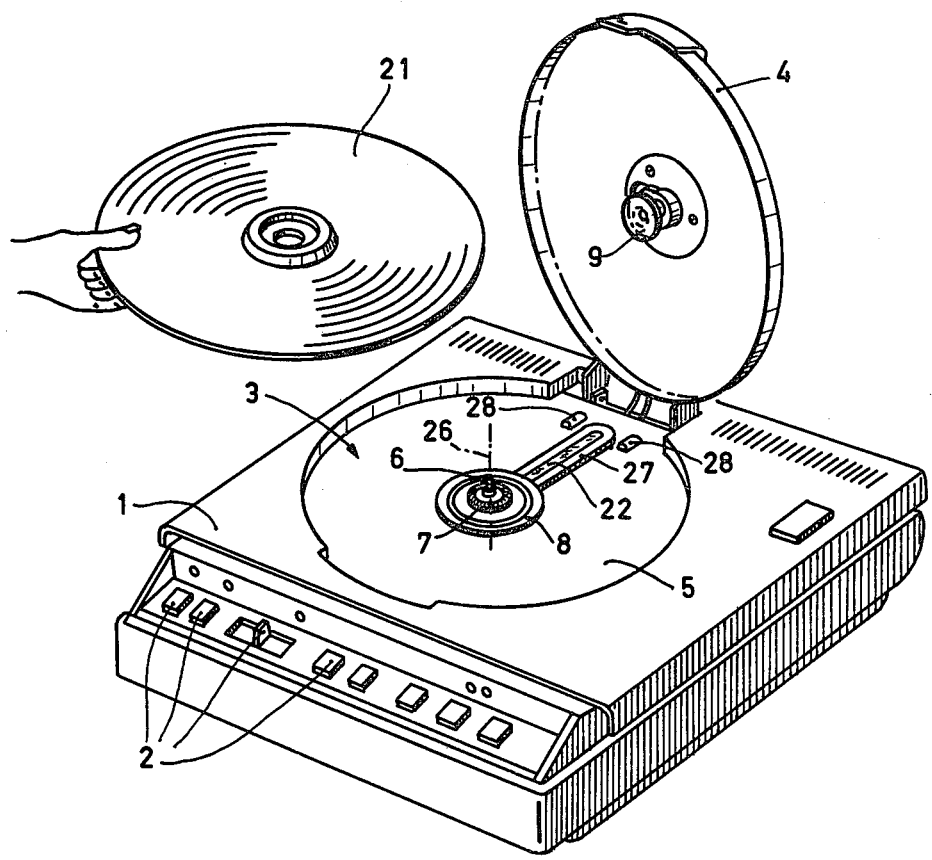
FIG. 1 is a perspective view of a video disc player with open cover.

The video disc player of FIG. 1 includes a main frame comprised of a cabinet 1 with a number of controls 2 at the front side for controlling the various functions. In the centre there is a recessed portion 3 which can be covered by means of a hinged cover 4. A drive spindle 6 extends through the substantially plane deck 5 in the recessed portion 3. The spindle is provided with a centering member 7 for a video disc 21 as well as a supporting table 8. The cover carries a disc loader 9 which is movable to a position opposite the centering member. The loader magnetically cooperates with the centering member in order to clamp the video disc on the supporting table. In the cabinet 1 there is mounted a mounting unit 10 belonging to the main frame, see FIG. 2, which unit comprises a subframe 11. Said subframe comprises a profiled injection-moulded portion to which the cover 4 is hinged. Furthermore, it accommodates substantially all the optical and mechanical elements necessary for the operation of the video disc player, such as the spindle 6 with the centering member 7 and the supporting table 8, as well as a drive motor for the spindle, not shown. Furthermore, it carries a laser 12, a number of optical elements 13, 14 and 15, see FIG. 3, as well as a movable objective frame 16 on which the objective 17 is movably guided. For further information with respect to the construction of the objective frame and the cooperation with the objective reference is made to U.S. Pat. No. 4,012,101 (herewith incorporated by reference). In the objective 17 there is arranged a lens system having an optical axis 18, in whose direction the objective can be moved upwards and downwards. For the parallel guidance of the objective 17 there is provided a bearing bush 19, which is rigidly connected to the objective frame 16.

Near the free end 20 of the objective 17, transversely of the optical axis 18 and between the lens system in the objective 17 and the location of the rotary video disc 21, there are arranged stationary plane-parallel and radiation-beam-transmitting shielding means 22 which are connected to the main frame for shielding the objective 17 from dust, contaminants and mechanical damage.

Figure 3:
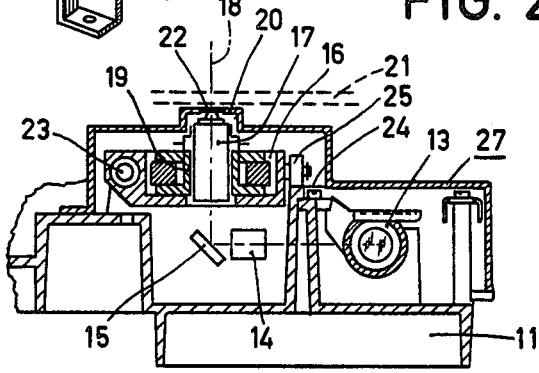
FIG. 3 is a cross-sectional view taken on the arrows III—III in FIG. 2.

The objective frame 16 is movable over the subframe 11 along a parallel guide by means of a drive motor, not shown. As is shown in FIG. 3 the parallel guide comprises a rod 23 and a flat guideway 24 over a which a roller 25 runs. See also FIG. 5, which shows a modified embodiment of the invention, but in which the subframe and the objective frame are identical except for some details. The laser 12 produces a light beam which enters the objective 17 via inter alia the optical elements 13, 14 and 15. Upon reflection of the focussed beam at the information surface of the video disc 21, the light beam returns to the interior of the video disc player via the objective 17 and the optical elements 15 and 14. The video signal, the audio signal as well as the signals required for the automatic control of the movements of the objective frame 16 and the objective 17 and for any other moving elements in the light path of the video disc player, are obtained by conversion of the light beam modulation into an electrical modulation with the aid of opto-electronic means, not shown, which are irrelevant for the present invention.

The shielding means 22 comprise a plane-parallel shielding plate having a thickness not greater than 0.5 mm. The objective frame 16 is movable relative to the main frame. Relative to the main frame and thus also to the subframe 11, the objective 17 follows a straight path between a first extreme position nearer the axis of rotation 26 of the video disc 21 and a second extreme position nearer the circumference of the video disc. The shielding plate 22 extends between the first and the second extreme position over the full length of the said path. The shielding plate may for example be constituted by a moulded polyamide sheet.

Figure 2:
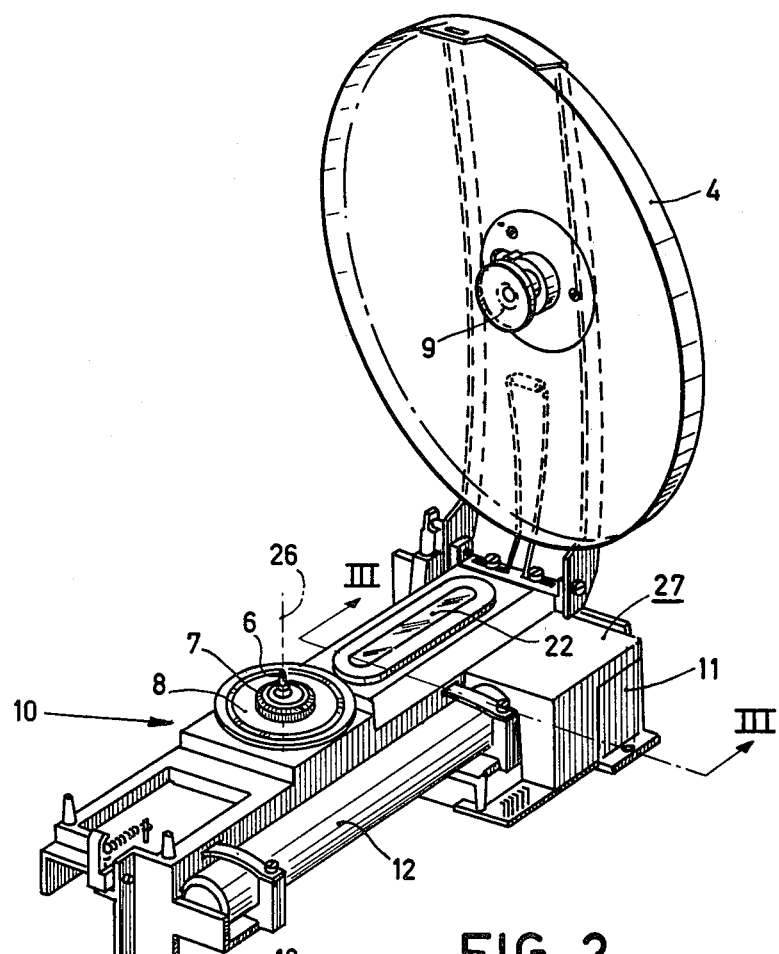
FIG. 2 is a perspective view of a mounting unit incorporated in the video disc player of FIG. 1.

As shown in FIGS. 2 and 3, the objective 17 is mounted in an enclosure 27, which encloses the objective in a substantially dust-tight manner, and the shielding plate 22 forms a part of said enclosure. The shielding plate may for example be connected to the rest of the enclosure by glueing, clamping or R.F. welding. The subframe 11 is designed so that the part covered by the enclosure 27 is also closed at the underside. As a result of this the objective 17 is accommodated in a fully enclosed space, so that an excellent protection against dust and damage is obtained. Said enclosure not only accommodates the objective but also the other optical components of the light path. The laser 12 is for the greater part disposed outside the enclosure 27. An important additional advantage of this embodiment of the invention is that annoying sounds as a result of the focussing movements of the objective 17 can be damped out in a considerably better manner.

In order to avoid contact between the enclosure 27, which carries the shielding plate 22, and the edge of a slightly sagging video disc when the video disc player is put into operation, two stop rollers 28 are arranged on the main frame 1 near the second extreme position of the objective 17 for cooperating with the edge of the sagging video disc in a rolling fashion.

Figure 4:
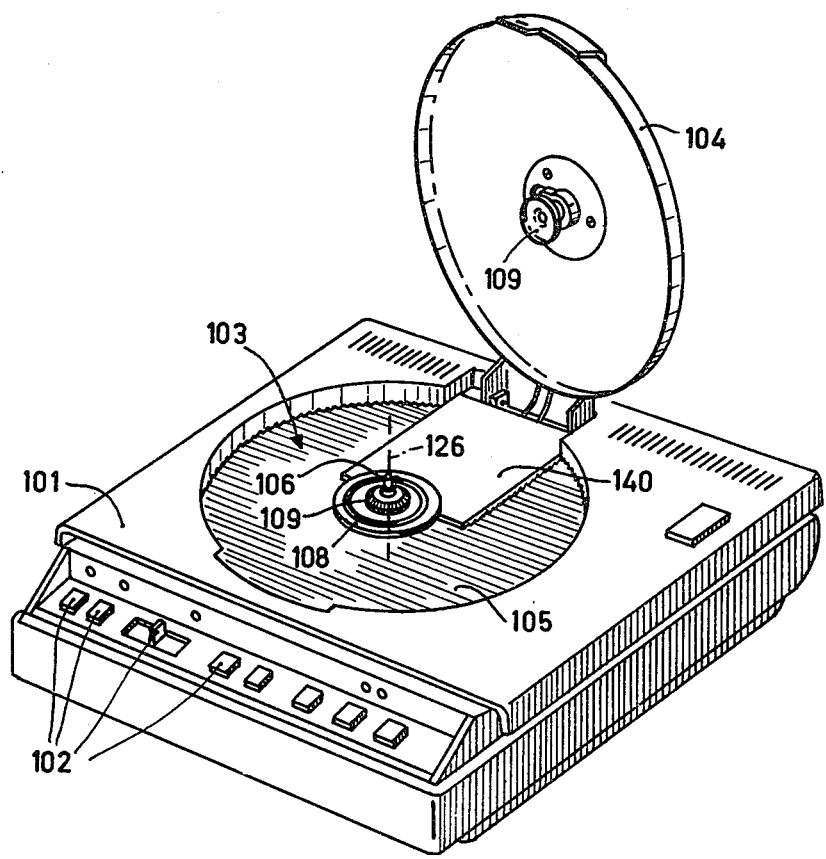
FIG. 4 is a perspective view of a modified video disc player.
Figure 5:
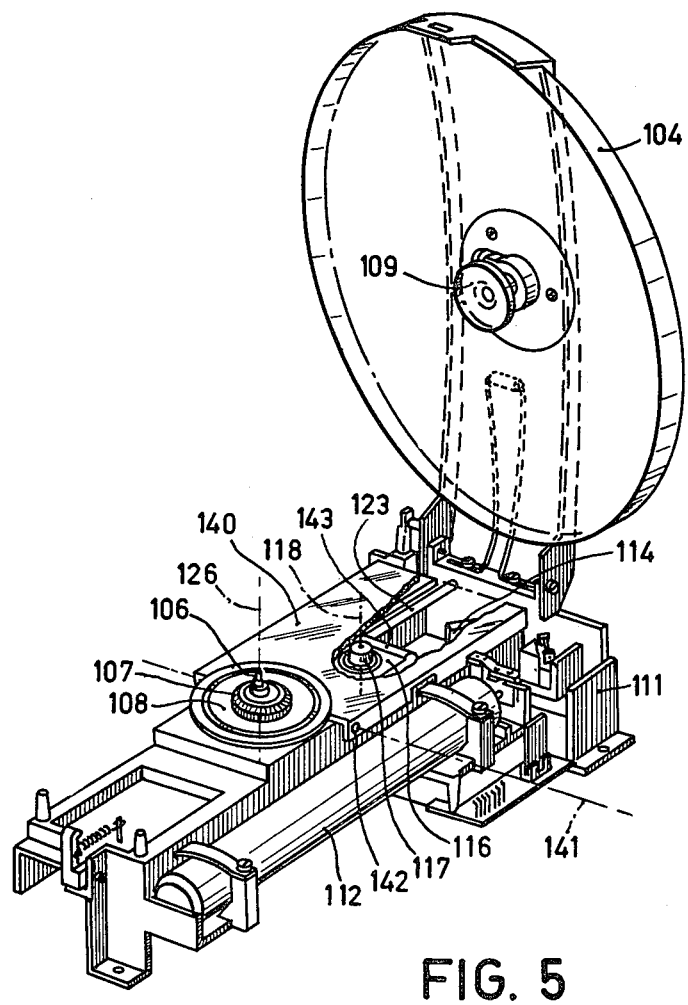
FIG. 5 is a perspective view of a modified mounting unit for the video disc player of FIG. 4.

FIGS. 4 and 5 relates to a video disc player which is largely identical to that of FIGS. 1 to 3, except for the means for shielding the objective. The components which are identical to those which also occur in FIGS. 1 to 3 are designated by reference numerals that are 100 higher than those in FIGS. 1 to 3. The shielding means comprise a broad shielding plate 140, which is integrally made of a suitable radiation-transparent plastic. Said shielding plate forms part of the deck 103 which constitutes the bottom of the recess 105 in the cabinet of the main frame 101. In this embodiment the shielding plate also extends over the entire length of the path which the movable objective 117 describes relative to the subframe 111. In order to avoid contact of the shielding plate 140 with the edge of a slightly sagging video disc when the video disc player is put into operation, the shielding plate is pivotably connected to the subframe 111, which belongs to the main frame, near the first extreme position of the objective system 116 which is situated near the spindle 106. As a result of this, the shielding plate is pivotable about the pivoting axis 141 perpendicular to the axis of rotation 126 of the video disc, namely between an inclined position, shown in FIGS. 4 and 5 and a horizontal position. The horizontal position is reached if the objective is in its second extreme position near the edge of the video disc. The means for pivotably connecting the shielding plate 140 to the subframe 111 may comprise two pivoting pins 142, one on each side of the shielding plate.

The objective frame 116 and the shielding plate 140 are provided with cooperating pivoting means. Said means comprise the lower surface of the shielding plate 140 and a ridge 143 on the objective frame. When the objective frame is moved from the first extreme position, see FIGS. 4 and 5, to the second extreme position, the shielding plate 140 is pivoted from the inclined position to the horizontal position by cooperation of the ridge 143 with the underside of the shielding plate 140. When the objective frame returns, the shielding plate is pivoted back from the horizontal position to the inclined position. The shielding plate can be pivoted back to the inclined position by its own weight but may also be urged in the direction of the inclined position by resilient means.

Figure 6:
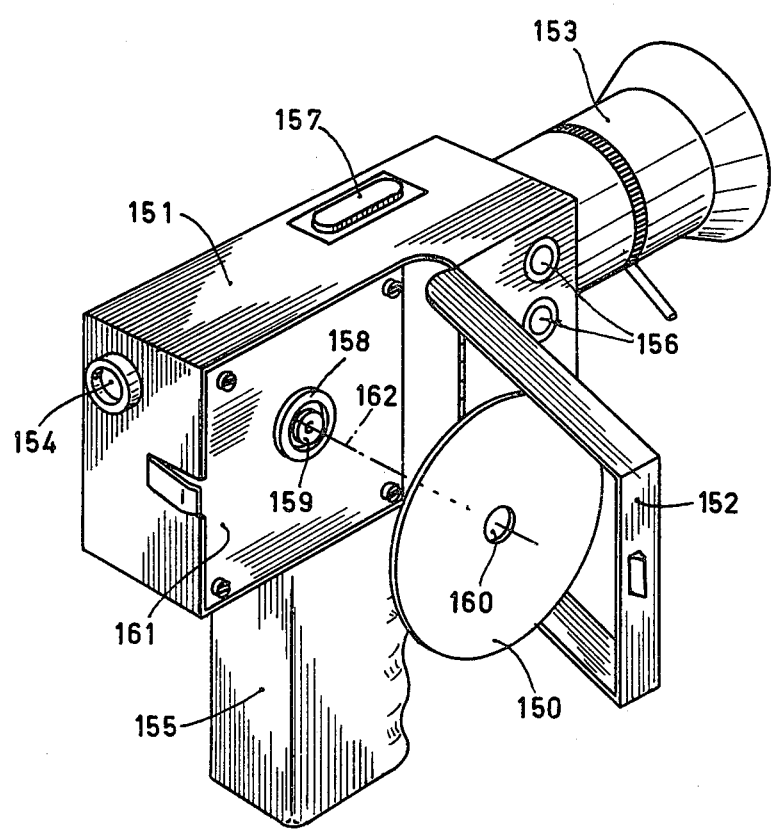
FIG. 6 is a perspective view of a video camera with an information disc on which video information is to be recorded.

FIG. 6 shows an electronic camera which is adapted to record video information on a rotary information disc 150. The camera comprises a main frame 151 on which there are arranged a pivotable cover 152, an objective 153, a view finder 154, a grip 155 and a number of controls 156 and 157. The information disc 150 can be fitted onto a turntable 158 on which a centring element 159 is located, the information disc being placed onto said element with its central opening 160. In the cover 152 there is arranged a disc loader, not shown, for pressing the information disc onto the turntable 158. The main frame 151 comprises a substantially flat frame plate 161 transverse of the axis of rotation 162 of the information disc. Said frame plate is entirely radiation-transparent and constitutes a shielding plate for an objective which is movable in the housing 151 of the camera. Via said objective video information can be recorded on the information disc with the aid of a radiation beam. The information disc may for example be of the type as described in U.S. Pat. No. 4,074,282 (herewith incorporated by reference).

What is claimed is:

1. An apparatus for recording and/or reading information in an information surface of an information disc which rotates about an axis of rotation, with the aid of a radiation beam, which apparatus comprises:
    a main frame (1),
    an objective frame (16),
    an objective (17), which is movable relative to the objective frame for concentrating the radiation beam to a radiation spot in a focussing plane and which comprises a lens system with one or more lenses and with an optical axis as well as a free end (20) to be directed to the information disc, and
    a parallel guide (19) for guiding the movements of the objective in the direction of its optical axis,
  characterized in
    that near the free end (20) of the movable objective (17) there are arranged stationary plane-parallel radiation-beam transmitting shielding means (22), which are connected to the main frame (1) transversely of the optical axis (18), between the lens system and the location of a rotary information disc (21) for shielding the objective from dust, contaminants and mechanical damage, and
    that the lens system is corrected for the optical properties of the shielding means.

2. An apparatus as claimed in claim 1, characterized in that the shielding means (22) comprise a plane-parallel shielding plate having a thickness not greater than 0.5 mm.

3. An apparatus as claimed in claim 1, the objective frame (16) being movable relative to the main frame (1), permitting the objective (17) to describe a path relative to the main frame between a first extreme position nearer the axis of rotation (26) of the information disc (21) and a second extreme position nearer the circumference of the information disc, characterized in that the shielding means (22) extend at least between the first and the second extreme position over the entire length of said path.

4. An apparatus as claimed in claim 3 for writing and/or reading information on a circular information disc (150), the main frame (151) comprising a substantially flat frame plate (161) transverse of the axis of rotation (162) of the information disc, characterized in that the shielding plate is integral with at least a part of the frame plate (FIG. 6).

5. An apparatus as claimed in claim 2, characterized in that the shielding plate (22) is made of a moulded polyamide foil.

6. An apparatus as claimed in claim 1, characterized in that
the objective is accommodated in an enclosure (27) which surrounds the objective in a substantially dust-tight manner, and
that the shielding means (22) form part of said enclosure (27). (FIGS. 1-3).

7. An apparatus as claimed in claim 3, characterized in that in order to preclude contact between the shielding means or parts carrying shielding means and the edge of a slightly sagging information disc (21) when the apparatus is put into operation, there is arranged at least one stop roller (28) on the main frame (1) near the second extreme position of the objective (17) for cooperating with the edge of an information disc (21) in a rolling fashion. (FIG. 1)

8. An apparatus for recording and/or reading information with a radiation beam on an information surface of an information disc which rotates about an axis of rotation, said apparatus comprising:
a main frame,
an objective frame,
an objective movable relative to the objective frame for concentrating the radiation beam to a radiation spot in a focussing plane, said objective having a free end facing the information disc and including a lens system with one or more lenses and an optical axis,
a parallel guide for guiding the movement of the objective in the direction of said optical axis,
the objective frame being movable relative to the main frame so as to permit the objective to describe a path relative to the main frame between a first extreme position nearer the axis of rotation of the information disc and a second extreme position nearer the circumference of the disc,
radiation transmitting shielding means disposed between said lens system and the location of the disc and extending over the entire length of said path between said first and second extreme positions for shielding the objective from dust, contaminants and mechanical damage, said shielding means being connected to the main frame for pivotable movement between an inclined position and a level position about a pivoting axis which is disposed near said first extreme position and which is perpendicular to the axis of rotation of the disc so as to preclude contact between the shielding means and an edge portion of a slightly sagging information disc when the apparatus is put into operation, and
means cooperating with said objective and said shielding means for moving said shielding means between said inclined and level positions when said objective moves between said first and second extreme positions.

* * * * *